United States Patent [19]
Alley

[11] 4,096,410
[45] Jun. 20, 1978

[54] INVERTER CIRCUIT PROTECTION

[75] Inventor: Robert P. Alley, Manlius, N.Y.

[73] Assignee: General Electric Company, Carmel, Ind.

[21] Appl. No.: 705,072

[22] Filed: Jul. 14, 1976

[51] Int. Cl.² .......................................... H05B 37/00
[52] U.S. Cl. ..................................... 315/86; 315/276; 307/66
[58] Field of Search ...................... 307/64, 66; 331/62; 328/8; 315/DIG. 7, 219, 176, 270, 178, 86, 160, 175, 209; 361/5, 13, 55, 56, 58; 321/11, 12, 13, 14; 336/170

[56] References Cited
U.S. PATENT DOCUMENTS 3,921,005  11/1975  Watrous ................................ 321/18

FOREIGN PATENT DOCUMENTS 796,976  4/1956  United Kingdom .......... 315/DIG. 7

Primary Examiner—Eugene R. LaRoche

[57] ABSTRACT

An emergency lighting system includes a switching transistor inverter circuit coupled with a layer wound output transformer for starting and operating a fluorescent lamp from a battery upon failure of AC line voltage. An integrated circuit control circuit provides logic to control operation of the system. To protect the control circuit from displacement currents produced through capacitive coupling as a result of rapid excursions in potential in the system, a guard winding is provided sandwiched between windings of the layer wound transformer. The guard winding is connected at one end to ground and to the control circuit thereby affording transient protection to sensitive circuit elements.

8 Claims, 1 Drawing Figure

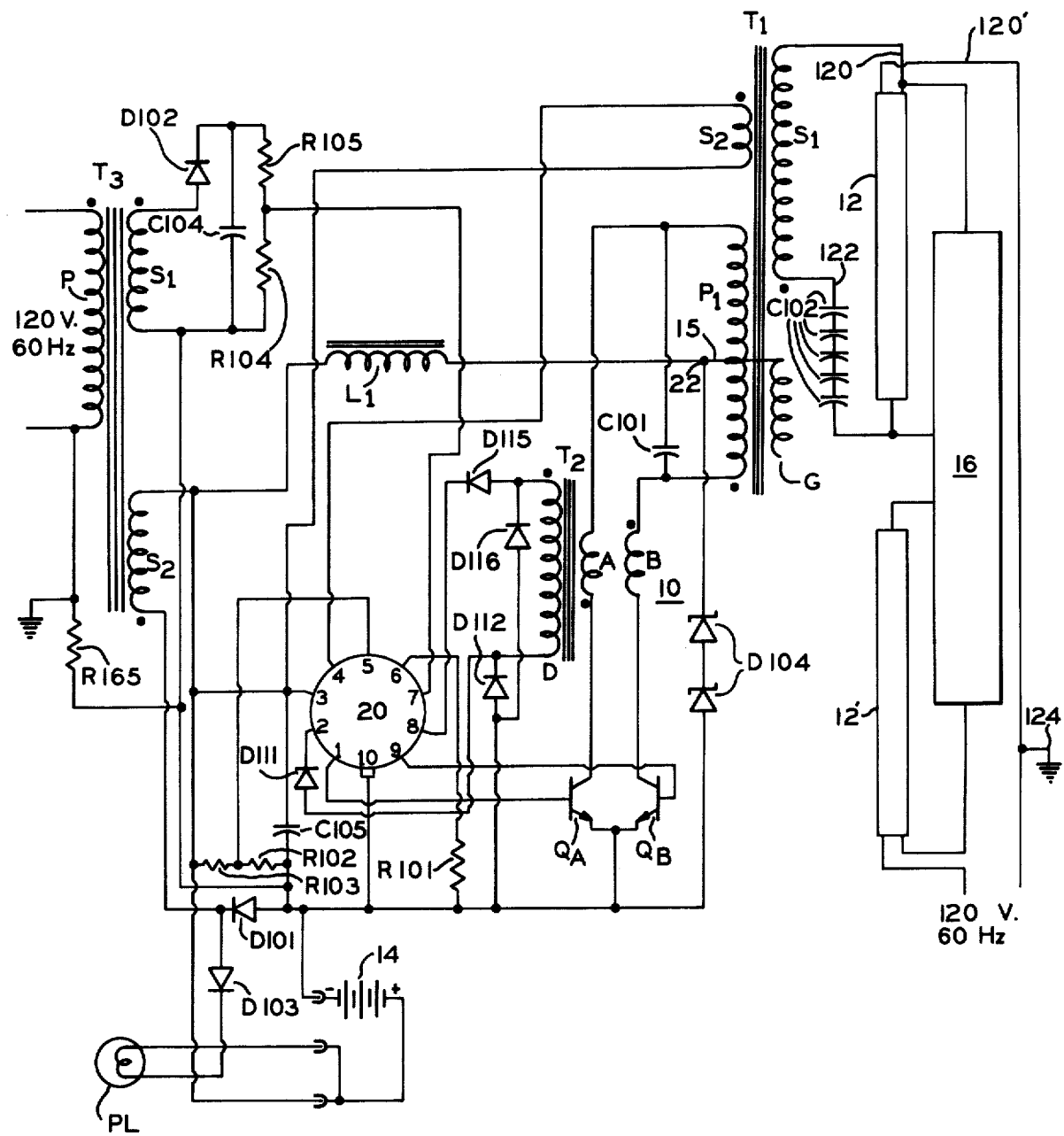

INVERTER CIRCUIT PROTECTION

CROSS-REFERENCE TO RELATED APPLICATION

The present invention is related to prior filed, copending application Ser. No. 646,009, filed Jan. 2, 1976, in the names of K. K. Klett and R. P. Alley, and assigned to General Electric Company.

BACKGROUND OF THE INVENTION

I. Field of the Invention

The present invention relates to a protection arrangement for a switching transistor inverter circuit, and, more particularly, to an emergency lighting circuit including an inverter with control means for operating a gaseous discharge lamp from a DC electrical energy source upon failure of the primary AC source, the circuit being provided with means for protecting the control means from capacitive displacement currents flowing as a reslt of rapid excursions in potential with respect to ground in the system.

II. Description of the Prior Art

Electric power failures due to inclement weather conditions and equipment breakdowns have been a plague for many years. A power failure, no matter what the cause may be, may very well jeopardize human life due to lighting system failure. There are, therefore, many installations which require some type of emergency lighting system which will automatically come into operation upon the occurrence of a power failure. result high efficiency of a fluorescent lamp makes it especially valuable for use in such an emergency lighting system.

Presently available emergency lighting systems are generally of the type using a transistor switching inverter and wherein a single lamp or group of lamps is used for both normal AC operation of the lighting system and for the emergency system, a battery being used as the power source for energizing the transistor inverter and the lamps when the AC line voltage fails. Advantageously, in order to control the operation of such a system, means are provided which may take the form of monolithic integrated circuit (IC). A system using such an IC controller is disclosed and claimed in U.S. Pat. No. 3,921,005 — Watrous, assigned to the assignee of the present invention. Such a controller performs a variety of functions as disclosed therein. However, rapid excursions in potential in the system with respect to ground may cause capacitive displacement currents to flow in the controller thereby possibly producing shifts in the circuit operating points, if the circuit continues to operate at all.

It is desirable, therefore, to provide an emergency lighting system including an inverter circuit wherein such capacitive coupling effects are minimized.

Accordingly, it is an object of the present invention to provide an emergency lighting system having an inverter with control means wherein means are provided for minimizing the effects of and for protecting the system control means from capacitive displacement currents flowing in the system.

SUMMARY OF THE INVENTION

In accordance with the present invention, there is provided an improved switching transistor inverter circuit for operating at least one gaseous discharge lamp from a DC electrical energy source. Included are means for minimizing the effects of and for protecting the circuit from capacitive displacement currents flowing as a result of rapid excursions in potential therein with respect to ground. In the preferred embodiment, the inverter circuit includes control means and a transformer for coupling the inverter circuit with the lamp, and the means for minimizing includes a guard winding associated with the transformer and operationally connected in circuit with the control means.

In another aspect of the present invention, there is provided an emergency lighting system including means for operating at least one gaseous discharge lamp from an AC electrical energy source during normal conditions when the AC source voltage is above a predetermined value and including a switching transistor inverter circuit for operating the lamp from a DC electrical energy source when the AC source voltage is below the predetermined value. Included are means for minimizing the effects of and for protecting the inverter circuit from capacitive displacement currents flowing as a result of rapid excursions in potential therein with respect to ground. In the preferred embodiment of this aspect of the invention, the emergency lighting system includes control means for controlling operation of the inverter circuit and a transformer for coupling the inverter circuit with the lamp. The means for minimizing includes a guard winding associated with the transformer, the guard winding being operationally connected in circuit with the control means for protection thereof.

BRIEF DESCRIPTION OF THE DRAWING

The accompanying drawing is a detailed schematic representation of an emergency lighting system incorporating the preferred embodiment of the present invention.

DESCRIPTION OF THE PREFERRED EMBODIMENT

Referring to the drawing, there is shown an emergency lighting system circuit which will automatically become operative upon failure of the primary electric source — line AC. Such a system is disclosed and claimed in U.S. Pat. No. 3,921,005 — Watrous, assigned to the assignee of the present invention and which is specifically incorporated herein by this reference. A switching transistor inverter circuit, tuned inverter 10, includes a pair of power transistors QA and QB capable of operation in a low-loss switching mode to energize a load such as gaseous discharge lamp 12. An auxiliary electrical energy source, a DC source, in the form of a rechargeable battery 14 provides the electrical power necessary to operate inverter 10. A buffer inductance L1 serves to enable transistors QA and QB to operate in the low-loss switching mode. A first transformer T1 couples the inverter 10 with the lamp 12 and is resonated with capacitors C101 and C102 to set the operating frequency of the inverter and to establish a sinusoidal output voltage. Inductor L1 is electrically connected with center tap 15 of primary winding P1 forming a part of transformer T1.

A control means, control circuit 20 (in the preferred embodiment, a monolithic integrated circuit) is provided for supplying base drive for switching transistors QA and QB at zero collector voltage: that is, when the instantaneous voltage across capacitor C101 is zero. Thus, as the primary voltage across transformer T1 varies at fundamental frequency, the voltage at point 22 and hence across inductor L1 varies at twice the fundamental frequency. The current through L1 is DC with a second harmonic component. This same current is alternately carried by the two transistors QA and QB. While the transistors are required to switch collector current, they do so at essentially zero collector voltage with a resultant low power dissipation. An auxiliary winding S2 magnetically coupled with the primary winding P1 of first transformer T1 provides timing information to the control circuit 20 for effecting switching of the respective transistors QA and QB in step with the natural resonant frequency of the inverter. Thus, the control circuit 20 tracks the resonant frequency of first transformer T1 and insures that transistor switching occurs when the voltage across capacitor C101 is zero. Winding T1 S2 is not used as a source of energy for driving the transistors QA and QB because of the sinusoidal transformer waveform.

A feedback transformer T2 is provided to supply a feedback current to the control circuit 20 for effecting transistor base drive proportional to transistor collector current thereby to effect higher efficiency in inverter 10. Feedback transformer T2 has a feedback winding D magnetically coupled to the respective collectors of the transistors QA and QB through a pair of windings A and B, respectively. Thus, the power consumed by the control circuit 20 can be limited to that required to start and control the oscillation of inverter 10. Lamps 12 and 12' are coupled to an AC source through a conventional ballast 16 for operation during normal conditions when the AC source voltage is above a predetermined value. An impedance limited transformer T3 provides, among other things, means for charging the battery 14. Battery 14 is connected to a secondary winding S2 of transformer T3 through a diode D101.

The emergency lighting system circuit shown operates generally as follows. Control circuit 20 includes a first sensor (not shown) for sensing the voltage of the AC source and a second sensor (not shown) for sensing the voltage of the battery. Further details of operation of the control circuit 20 may be had by referring to the above-mentioned Watrous patent. Control circuit 20 also includes logic means (not shown) combining the outputs of the first sensor and the second sensor to enable inverter 10 when the battery voltage is above a predetermined level and the AC voltage is below a predetermined level and to disable the inverter when the battery voltage is below a predetermined level or the AC voltage is above a predetermined level.

Assuming now that the inverter 10 is enable to run, control circuit 20 supplies a small base drive signal to one of the transistors QA and QB. Assuming that the base drive is applied to QA, transistor QA turns on and current starts to flow from battery 14 through inductor L1, to center tap 15 of the primary P1 of the transformer T1, thence through P1 and through the A winding of feedback transformer T2, through transistor QA, thence back to the battery. The base drive originally supplied to transistor QA is augmented by a current flowing from winding D of feedback transformer T2 to the control circuit 20 to exit from pin 1 thereof thence to flow through the base of transistor QA. This base drive then is proportional to the collector current of transistor QA and is designed to be adequate to keep the transistor in saturation.

At some volt-second product, feedback transformer T2 saturates sharply, suddenly reducing the output current of winding D thereof, thereby reducing the base drive to transistor QA. A sudden rise in collector-emitter voltage on transistor QA sharply reduces the rate of current rise in this DC circuit. This change in collector current with respect to time reverses the polarity of the S2 winding of transformer T1 and hence the polarity of the voltage on pins 3 and 4 of the control circuit 20. This reversal of polarity signals the control circuit to change the base drive from transistor QA to transistor QB.

Control circuit 20 now supplies a small amount of base drive through pin 9 to the base of transistor QB and simultaneously connects the base of QA to the emitter thereof to hasten the turn-off process of transistor QA. Transistor QB then starts to conduct as a result of the small base drive signal from the control circuit and current flows through winding B of feedback transformer T2 to induce a current in winding D thereof. This current is supplied to control circuit 20. Control circuit 20 now supplies this current as base drive out of pin 9 to the base of QB; thus, the base drive of QB is proportional to the collector current thereof such that the transistor is kept in saturation.

Transformer T1 has an air gap and operates as a nearly linear inductor. When the voltage across winding P1 of transformer T1, and thereby the voltage on winding S2 of that transformer, reaches zero, this event is signaled to the control circuit 20 through pins 3 and 4 thereof. The control circuit again switches the base drive circuitry to transistor QA and connects the base of QB to the emitter thereof to hasten the switching off of the transistor QB. The circuit is then ready to go through the next half-cycle with QA conducting.

If switching could be accomplished in absolute zero time, the above described circuit operation would be entirely correct. However, the switching is accomplished normally in periods of less than 1 microsecond and the current flow from the battery 14 is essentially at a constant level with a small ripple content. This ripple content is determined by the inductance of L1 which adds or subtracts from the battery voltage as applied to the center tap 15 on the primary winding on the transformer T1. It is this inductor L1 which adjusts the voltage at point 22 in such a way that the transistors may be switched at zero collector voltage. As long as this inductance L1 has a value exceeding a critical value, the circuit will function as described. In the event that both transistors QA and QB are in the off state, the rate of current change in L1 forces the voltage thereacross to a value where zener diodes D104 start conducting to limit the voltage applied to the circuit. This clipping action rapidly reduces circuit efficiency and hence is a operational mode to be avoided. Such clipping action can occur momentarily during the starting process or when the inverter is turned off and under these conditions represents an acceptable design operating condition.

The load for the inverter 10 which includes lamp 12 is connected to winding S1 of transformer T1. For fluorescent emergency lighting purposes, the ballasting is done by capacitors C102 which determine the load current through the lamp 12. These capacitances in conjunction with C101 and the inductance of T1 P1 determine the operational frequency of this system. (The inductance of the P1 winding and the capacitance of C101 determine the oscillating frequency when S1 is unloaded.) A quintuple capacitive ballast system is used to reduce the voltage across a single unit and thus to enhance the reliability of the complete system. The voltage output of the inverter circuit is high enough to instant start eight foot long, instant-start lamps under fairly adverse conditions.

As stated above, battery charging is accomplished through winding S2 of 60 Hz transformer T3. Half-wave charging current is coupled to a nonlinear load, battery 14, through diode D101 and is limited in magnitude by the impedance of the transformer. Because of the transformer impedance, the sinusoidal voltage at the terminals of winding S2 is clamped at the battery voltage when diode D101 conducts. On the alternate half-cycle, diode D103 conducts half-wave current through indicator lamp PL and the three prong battery plug. Thus, the battery must be plugged in and 120 volt AC power available to energize lamp PL indicating that the battery is charging. Using the alternate half-cycle reduces the volt-amp rating of the transformer T3. For monitoring the AC source voltage, means are provided for coupling secondary winding S1 of the transformer T3 with a linear load during an alternate half cycle. To this end, during the half-cycle alternate from that in which the battery is charged, capacitor C104 is charged through diode D102. This DC monitoring voltage is connected to the first sensor means through pin 7 of control circuit 20 and through a linear load, resistor-divider R104 and R105. The DC voltage at pin 7 is proportional to the average value of the 60 Hz supply voltage and is not influenced by the aforesaid clamping action of the battery. Thus, transformer T3 serves a dual purpose.

As hereinbefore stated, it is desirable that an emergency lighting system which includes an inverter circuit be provided wherein the deleterious effects of capacitive displacement currents will be minimized. In accordance with the present invention, there is provided, in a switching transistor inverter circuit for operating a gaseous discharge lamp from a DC electrical energy source, means for minimizing the effects of and for protecting the circuit from capacitive displacement currents flowing as a result of rapid excursions in potential with respect to ground in the circuit. In the preferred embodiment as shown in the drawing, inverter circuit 10 is of the switching transistor type and includes, as hereinbefore stated, output transformer T1 including primary winding P1 for connection to the inverter output, secondary winding S1 for connecting to lamp 12 and secondary winding S2 for providing timing information to control circuit 10. As disclosed and described in the aforementioned Watrous U.S. Pat. No. 3,921,005, control circuit 20, which may be in the form of a monolithic integrated circuit, is provided for controlling the operation of the emergency lighting system and the inverter circuit 10. In the preferred embodiment, the means for minimizing includes a guard circuit which takes the form of a guard winding G associated with the transformer T1. Transformer T1 is of the layer wound type and guard winding G comprises a single layer of wire placed between secondary windings S1 and S2 and with one end of the wire being connected with center tap 15 of the primary winding P1. Tap 15 is connected to pin 10 of the control circuit 20 through a pair of zener diodes D104.

With this guard winding arrangement, when rapid excursions in potential of the output winding with respect to ground in the system cause, due to capacitive coupling, capacitive displacement current to flow to ground in this emergency lighting system, control circuit 20 is protected. By being interposed between the high voltage winding S1 of T1 and the sensitive parts of the inverter circuit, the guard winding G serves to conduct these currents to ground thereby to protect control circuit 20.

The emergency lighting system including the inverter shown in the drawing has been built and has operated satisfactorily with components having the following values:

| | |
|---|---|
| Transistors QA, QB | GE D44C10 |
| Transformer T1 | Primary winding D1 - 56 turns |
| | tapped at 28 turns |
| | Load winding S1 - 2370 turns |
| | Feedback winding S2 - 11 turns |
| | Guard winding G - 110 turns |
| Transformer T2 | Collector windings A & B - 8 turns |
| | Output winding D - 160 turns |
| Transformer T3 | Primary winding P - 1058 turns |
| | Secondary winding S1 - 217 turns |
| | Secondary winding S2 - 210 turns |
| Lamps 12, 12' | F96T12/IS |
| Battery 14 | 12.0 V DC |
| Resistor R101 | 15 K ohms |
| Resistor R102 | 22 K ohms |
| Resistor R103 | 18 K ohms |
| Resistor R104 | 22 K ohms |
| Resistor R105 | 270 K ohms |
| Capacitor C101 | 0.68 uF |
| Capacitors C 102 (5) | .0075 uF (ea) |
| Capacitor C105 | .01 uF |
| Capacitor C104 | .33 uF |
| Diodes D101, D102, D103 | IN 4004 |
| Diodes D111, D112, D115, D116 | Da 1701 |
| Zener Diodes D104 (2) | 21 V ± 5%, ¼ W (ea) |

The specific inverter circuit and/or emergency lighting circuits herein described are intended as exemplary and not limitative of the invention. For example, an inverter need not be coupled to a load by a transformer; direct coupling has been contemplated however, with appropriate circuitry changes. In such applications, other power level switching arrangements will occur to those skilled in the art. Other inverter configurations certainly have been contemplated and include the bridge switching type and others. The appended claims are intended to include such modifications, and others which may occur to those skilled in the art, as coming within the true spirit and scope of the invention.

What is claimed is:

1. A circuit for operating at least one gaseous discharge lamp from a DC electrical energy source, comprising:
a switching transistor inverter for converting direct current from the DC source to high frequency alternating current and including means for connection to the at least one lamp;
control means for controlling operation of the inverter; and
means for protecting the control means from capacitive displacement currents flowing in the circuit.

2. The invention of claim 1 wherein the inverter further includes a transformer for coupling the inverter with the at least one lamp and the means for protecting includes a guard winding associated with the transformer and operationally connected to the control means and to ground.

3. The invention of claim 2 wherein the transformer is of the layer wound type having at least a primary winding and further having a first secondary winding wound on a second seconday winding; the guard winding including a single layer of wire placed between the first and second secondary windings and having one end connected in circuit with the control means and operationally connected to ground.

4. The invention of claim 3 wherein the primary winding includes a center tap, the guard winding being connected in circuit therewith.

5. The invention of claim 1 wherein the control means includes a monolithic integrated circuit.

6. An emergency lighting circuit for operating a gaseous discharge lamp from an AC electrical energy source during normal conditions when the AC source voltage is above a predetermined value and from a DC electrical energy source during emergency conditions when the AC source voltage is below the predetermined value, comprising:

means for connecting to and operating the lamp from the AC source during normal conditions;

means including a switching transistor inverter for connecting to and operating the lamp from the DC source during emergency conditions;

control means for controlling operation of the inverter; and means for protecting the control means from capacitive displacement currents flowing in the circuit.

7. The invention of claim 6 wherein the inverter further includes a transformer for coupling the inverter with the lamp; and the means for protecting includes a guard winding associated with the transformer, the guard winding being operationally connected to the control means for protection thereof.

8. The invention of claim 7 wherein the transformer is of the layer wound type and includes: a primary winding having a center tap; a first secondary winding wound upon a second secondary winding; the guard winding including a single layer of wire placed between the first and second secondary windings and having one end connected with the primary winding center tap and operationally connected to ground.

* * * * *